United States Patent
Wang et al.

(10) Patent No.: US 8,349,964 B2
(45) Date of Patent: Jan. 8, 2013

(54) REVERSIBLE POLYMER/METAL NANO-COMPOSITES AND METHOD FOR MANUFACTURING SAME

(75) Inventors: Xiaorong Wang, Hudson, OH (US); Victor J. Foltz, Akron, OH (US); Pat Sadhukhan, Akron, OH (US); Georg C. A. Böhm, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 992 days.

(21) Appl. No.: 12/047,896

(22) Filed: Mar. 13, 2008

(65) Prior Publication Data

US 2008/0305336 A1 Dec. 11, 2008

Related U.S. Application Data

(62) Division of application No. 10/872,731, filed on Jun. 21, 2004, now abandoned.

(51) Int. Cl.
C01D 7/00 (2006.01)
(52) U.S. Cl. ....... 525/314; 525/333.3; 525/84; 524/413; 524/521
(58) Field of Classification Search .................. 525/314, 525/333.3, 84; 524/413, 521
See application file for complete search history.

(56) References Cited

U.S. PATENT DOCUMENTS

| | | |
|---|---|---|
| 2,531,396 A | 11/1950 | Carter et al. |
| 3,598,884 A | 8/1971 | Wei |
| 3,793,402 A | 2/1974 | Owens |
| 3,840,620 A | 10/1974 | Gallagher |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lal et al. |
| 4,326,008 A | 4/1982 | Rembaum |
| 4,386,125 A | 5/1983 | Shiraki et al. |
| 4,463,129 A | 7/1984 | Shinada et al. |
| 4,471,093 A | 9/1984 | Furukawa et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fluwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |

(Continued)

FOREIGN PATENT DOCUMENTS

CA 2127919 3/1995

(Continued)

OTHER PUBLICATIONS

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

(Continued)

*Primary Examiner* — Kelechi Egwim
(74) *Attorney, Agent, or Firm* — Meredith E. Hooker; Nathan T. Lewis (57) ABSTRACT

The present invention provides a polymer/metal nano-composite. The nano-composite includes at least one copolymer chain having alkenyl monomer units and maleimide monomer units, and a nano-sized metal or inorganic crystal. It also provides a method of producing nano-sized metal/inorganic crystals in pure form. These nano-composites and nano-crystals can be useful as polymer fillers, tire rubber compounds, semiconductors, nano-magnets, catalysts, and quantum dots etc.

6 Claims, 2 Drawing Sheets

U.S. PATENT DOCUMENTS

| | | | |
|---|---|---|---|
| 5,514,734 A | 5/1996 | Maxfield et al. | |
| 5,514,753 A | 5/1996 | Ozawa et al. | |
| 5,521,309 A | 5/1996 | Antkowiak et al. | |
| 5,525,639 A | 6/1996 | Keneko et al. | |
| 5,527,870 A | 6/1996 | Maeda et al. | |
| 5,530,052 A | 6/1996 | Takekoshi et al. | |
| 5,580,925 A | 12/1996 | Iwahara et al. | |
| 5,587,423 A | 12/1996 | Brandstetter et al. | |
| 5,594,072 A | 1/1997 | Handlin, Jr. et al. | |
| 5,614,579 A | 3/1997 | Roggeman et al. | |
| 5,627,252 A | 5/1997 | De La Croi Habimana | |
| 5,674,592 A | 10/1997 | Clark et al. | |
| 5,686,528 A | 11/1997 | Wills et al. | |
| 5,688,856 A | 11/1997 | Austgen, Jr. et al. | |
| 5,707,439 A | 1/1998 | Takekoshi et al. | |
| 5,728,791 A | 3/1998 | Tamai et al. | |
| 5,733,975 A | 3/1998 | Aoyama et al. | |
| 5,739,267 A | 4/1998 | Fujisawa et al. | |
| 5,742,118 A | 4/1998 | Endo et al. | |
| 5,747,152 A | 5/1998 | Oka et al. | |
| 5,763,551 A | 6/1998 | Wunsch et al. | |
| 5,773,521 A | 6/1998 | Hoxmeier et al. | |
| 5,777,037 A | 7/1998 | Yamanaka et al. | |
| 5,811,501 A | 9/1998 | Chiba et al. | |
| 5,834,563 A | 11/1998 | Kimura et al. | |
| 5,847,054 A * | 12/1998 | McKee et al. | 525/314 |
| 5,849,847 A | 12/1998 | Quirk | |
| 5,855,972 A | 1/1999 | Kaeding | |
| 5,883,173 A | 3/1999 | Elspass et al. | |
| 5,891,947 A | 4/1999 | Hall et al. | |
| 5,905,116 A | 5/1999 | Wang et al. | |
| 5,910,530 A | 6/1999 | Wang et al. | |
| 5,955,537 A | 9/1999 | Steininger et al. | |
| 5,986,010 A | 11/1999 | Clites et al. | |
| 5,994,468 A | 11/1999 | Wang et al. | |
| 6,011,116 A | 1/2000 | Aoyama et al. | |
| 6,020,446 A | 2/2000 | Okamoto et al. | |
| 6,025,416 A | 2/2000 | Proebster et al. | |
| 6,025,445 A | 2/2000 | Chiba et al. | |
| 6,060,549 A | 5/2000 | Li et al. | |
| 6,060,559 A | 5/2000 | Feng et al. | |
| 6,087,016 A | 7/2000 | Feeney et al. | |
| 6,087,456 A | 7/2000 | Sakaguchi et al. | |
| 6,106,953 A | 8/2000 | Zimmermann et al. | |
| 6,117,932 A | 9/2000 | Hasegawa et al. | |
| 6,121,379 A | 9/2000 | Yamanaka et al. | |
| 6,127,488 A | 10/2000 | Obrecht et al. | |
| 6,147,151 A | 11/2000 | Fukumoto et al. | |
| 6,166,855 A | 12/2000 | Ikeyama et al. | |
| 6,180,693 B1 | 1/2001 | Tang et al. | |
| 6,191,217 B1 | 2/2001 | Wang et al. | |
| 6,197,849 B1 | 3/2001 | Zilg et al. | |
| 6,204,354 B1 | 3/2001 | Wang et al. | |
| 6,207,263 B1 | 3/2001 | Takematsu et al. | |
| 6,225,394 B1 | 5/2001 | Lan et al. | |
| 6,252,014 B1 | 6/2001 | Knauss | |
| 6,255,372 B1 | 7/2001 | Lin et al. | |
| 6,268,451 B1 | 7/2001 | Faust et al. | |
| 6,277,304 B1 | 8/2001 | Wei et al. | |
| 6,348,546 B2 | 2/2002 | Hiiro et al. | |
| 6,359,075 B1 | 3/2002 | Wollum et al. | |
| 6,379,791 B1 | 4/2002 | Cernohous et al. | |
| 6,383,500 B1 | 5/2002 | Wooley et al. | |
| 6,395,829 B1 | 5/2002 | Miyamoto et al. | |
| 6,420,486 B1 | 7/2002 | DePorter et al. | |
| 6,437,050 B1 | 8/2002 | Krom et al. | |
| 6,441,090 B1 | 8/2002 | Demirors et al. | |
| 6,448,353 B1 | 9/2002 | Nelson et al. | |
| 6,489,378 B1 | 12/2002 | Sosa et al. | |
| 6,524,595 B1 | 2/2003 | Perrier et al. | |
| 6,573,313 B2 | 6/2003 | Li et al. | |
| 6,573,330 B1 | 6/2003 | Fujikake et al. | |
| 6,598,645 B1 | 7/2003 | Larson | |
| 6,649,702 B1 | 11/2003 | Rapoport et al. | |
| 6,663,960 B1 | 12/2003 | Murakami et al. | |
| 6,689,469 B2 | 2/2004 | Wang et al. | |
| 6,693,746 B1 | 2/2004 | Nakamura et al. | |
| 6,706,813 B2 | 3/2004 | Chiba et al. | |
| 6,706,823 B2 | 3/2004 | Wang et al. | |
| 6,727,311 B2 | 4/2004 | Ajbani et al. | |
| 6,737,486 B2 | 5/2004 | Wang | |
| 6,750,297 B2 | 6/2004 | Yeu et al. | |
| 6,759,464 B2 | 7/2004 | Ajbani et al. | |
| 6,774,185 B2 | 8/2004 | Hergenrother et al. | |
| 6,777,500 B2 | 8/2004 | Lean et al. | |
| 6,780,937 B2 * | 8/2004 | Castner | 525/193 |
| 6,835,781 B2 | 12/2004 | Kondou et al. | |
| 6,858,665 B2 | 2/2005 | Larson | |
| 6,861,462 B2 | 3/2005 | Parker et al. | |
| 6,872,785 B2 | 3/2005 | Wang et al. | |
| 6,875,818 B2 | 4/2005 | Wang | |
| 6,908,958 B2 | 6/2005 | Maruyama et al. | |
| 6,956,084 B2 | 10/2005 | Wang et al. | |
| 7,056,840 B2 | 6/2006 | Miller et al. | |
| 7,071,246 B2 | 7/2006 | Xie et al. | |
| 7,112,369 B2 | 9/2006 | Wang et al. | |
| 7,179,864 B2 | 2/2007 | Wang | |
| 7,193,004 B2 | 3/2007 | Weydert et al. | |
| 7,205,370 B2 | 4/2007 | Wang et al. | |
| 7,217,775 B2 | 5/2007 | Castner | |
| 7,238,751 B2 | 7/2007 | Wang et al. | |
| 7,244,783 B2 | 7/2007 | Lean et al. | |
| 7,291,394 B2 | 11/2007 | Winkler et al. | |
| 7,347,237 B2 | 3/2008 | Xie et al. | |
| 7,408,005 B2 | 8/2008 | Zheng et al. | |
| 2001/0053813 A1 | 12/2001 | Konno et al. | |
| 2002/0007011 A1 | 1/2002 | Konno et al. | |
| 2002/0045714 A1 | 4/2002 | Tomalia et al. | |
| 2002/0095008 A1 | 7/2002 | Heinrich et al. | |
| 2002/0144401 A1 | 10/2002 | Nogueroles Vines et al. | |
| 2003/0004250 A1 | 1/2003 | Ajbani et al. | |
| 2003/0032710 A1 | 2/2003 | Larson | |
| 2003/0124353 A1 | 7/2003 | Wang et al. | |
| 2003/0130401 A1 | 7/2003 | Lin et al. | |
| 2003/0149185 A1 | 8/2003 | Wang et al. | |
| 2003/0198810 A1 | 10/2003 | Wang et al. | |
| 2003/0225190 A1 | 12/2003 | Borbely et al. | |
| 2004/0033345 A1 | 2/2004 | Dubertret et al. | |
| 2004/0059057 A1 | 3/2004 | Swisher et al. | |
| 2004/0091546 A1 | 5/2004 | Johnson et al. | |
| 2004/0127603 A1 | 7/2004 | Lean et al. | |
| 2004/0143064 A1 | 7/2004 | Wang | |
| 2004/0198917 A1 | 10/2004 | Castner | |
| 2005/0101743 A1 | 5/2005 | Stacy et al. | |
| 2005/0182158 A1 | 8/2005 | Ziser et al. | |
| 2005/0192408 A1 | 9/2005 | Wang et al. | |
| 2005/0197462 A1 | 9/2005 | Wang et al. | |
| 2005/0203248 A1 | 9/2005 | Zheng et al. | |
| 2005/0215693 A1 | 9/2005 | Wang et al. | |
| 2005/0228072 A1 | 10/2005 | Winkler et al. | |
| 2005/0228074 A1 | 10/2005 | Warren et al. | |
| 2005/0282956 A1 | 12/2005 | Wang et al. | |
| 2006/0084722 A1 | 4/2006 | Bohm et al. | |
| 2006/0173115 A1 | 8/2006 | Fudemoto et al. | |
| 2006/0173130 A1 | 8/2006 | Wang et al. | |
| 2006/0235128 A1 | 10/2006 | Wang et al. | |
| 2007/0027264 A1 | 2/2007 | Wang et al. | |
| 2007/0135579 A1 | 6/2007 | Obrecht et al. | |
| 2007/0142550 A1 | 6/2007 | Scurati et al. | |
| 2007/0142559 A1 | 6/2007 | Wang et al. | |
| 2007/0149649 A1 | 6/2007 | Wang et al. | |
| 2007/0161754 A1 | 7/2007 | Wang et al. | |
| 2007/0185273 A1 | 8/2007 | Wang et al. | |
| 2007/0196653 A1 | 8/2007 | Hall et al. | |
| 2008/0145660 A1 | 6/2008 | Wang et al. | |
| 2008/0149238 A1 | 6/2008 | Kleckner et al. | |
| 2008/0160305 A1 | 7/2008 | Warren et al. | |
| 2008/0188579 A1 | 8/2008 | Wang et al. | |
| 2008/0286374 A1 | 11/2008 | Wang et al. | |
| 2009/0005491 A1 | 1/2009 | Warren | |
| 2009/0048390 A1 | 2/2009 | Wang et al. | |
| 2009/0054554 A1 | 2/2009 | Wang et al. | |
| 2009/0270558 A1 | 10/2009 | Gandon-pain et al. | |
| 2010/0004398 A1 | 1/2010 | Wang et al. | |
| 2010/0016472 A1 | 1/2010 | Wang et al. | |
| 2010/0016512 A1 | 1/2010 | Wang et al. | |

FOREIGN PATENT DOCUMENTS

| | | |
|---|---|---|
| DE | 3434983 | 4/1986 |
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 1/2003 |
| EP | 1321489 | 6/2003 |
| EP | 1783168 | 5/2007 |
| FR | 2099645 | 3/1972 |
| JP | 01279943 | 1/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08199062 | 8/1996 |
| JP | 2000-514791 | 11/2000 |
| JP | 2003-095640 | 4/2003 |
| JP | 2006-072283 | 3/2006 |
| JP | 2006-106596 | 4/2006 |
| JP | 2007-304409 | 11/2007 |
| WO | 91/04992 | 4/1991 |
| WO | 97/04029 | 2/1997 |
| WO | 9853000 | 11/1998 |
| WO | 0075226 | 12/2000 |
| WO | 01/87999 | 11/2001 |
| WO | 02/31002 | 4/2002 |
| WO | 02471987 | 5/2002 |
| WO | 02/81233 | 10/2002 |
| WO | 02/100936 | 12/2002 |
| WO | 03/032061 | 4/2003 |
| WO | 03085040 | 10/2003 |
| WO | 2004/058874 | 7/2004 |
| WO | 2006/069793 | 7/2006 |
| WO | 2008/014464 | 1/2008 |
| WO | 2008/079276 | 7/2008 |
| WO | 2008/079807 | 7/2008 |
| WO | 2009/006434 | 1/2009 |

OTHER PUBLICATIONS

Ishizu, Koji et al., "Preparation of core-shell type polymer microspheres from anionic block copolymers", Polymer, vol. 34, No. 18, pp. 3929-3933 (1993).

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

Bahadur, Pratap, "Block copolymers—Their microdomain formation (in solid state) and surfactant behaviour (in solution)", Current Science, vol. 80, No. 8, pp. 1002-1007 (Apr. 25, 2001).

Baraton M. I., "Synthesis, Functionalization and Surface Treatment of Nanoparticles", ASP (Am. Sci. Pub.), Stevenson Ranch, California, pp. 51-52, 174-208 (2003).

Canham et al., "Formation of Worm-like Micelles from a Polystyrene-Polybutadiene-Polystyrene Block Copolymer in Ethyl Acetate", J.C.S. Faraday I, 76, 1857-1867 (1980).

Chen, Wei et al., "Ultrahydrophobic and Ultrayophobic Surfaces: Some Comments and Examples", The ACS Journal of Surfaces and Colloids, vol. 15, No. 10, Polymer Science and Engineering Dept., Univ. of MA, Amherst, MA 01003, pp. 3395-3399 (May 11, 1999).

Coleman, Lester E. et al., "Reaction of Primary Aliphatic Amines with Maleic Anhydride", J. Org. Chem., 24, 185, pp. 135-136 (1959).

Coulson, S.R. et al., "Super-Repellent Composite Fluoropolymer Surfaces", The Journal of Physical Chemistry B, vol. 104, No. 37, Dept. of Chemistry, Science Laboratories, Durham University, Durham, DH1 3LE, England, U.K., pp. 8836-8840 (Sep. 21, 2000).

Cosgrove, T. et al., Macromolecules, 26, pp. 4363-4367 (1993).

Dieterich, W. et al., "Non-Debye Relaxations in Disordered Ionic Solids", Chem. Chys., 284, pp. 439-467 (2002).

Ege, Seyhan, Organic Chemistry Structure and Reactivity, 3rd Edition, p. 959 (1994).

Erbil, H. Yildirim et al. "Transformation of a Simple Plastic into a Superhydrophobic Surface", Science vol. 299, pp. 1377-1380 (Feb. 28, 2003).

Giannelis, E.P., "Polymer Layered Silicate Nanocomposites", Advanced Materials vol. 8, No. 1, pp. 29-35 (Jan. 1, 1996).

Greenwod, N. N.; Earnshaw, A., Chemistry of the Elements, pp. 1126-1127, Pergaroen Press, New York (1984).

Guo, Andrew et al., "Star Polymers and Nanospheres from Cross-Linkable Diblock Copolymers", Macromolecules, vol. 29, pp. 2487-2493 (Jan. 17, 1996).

Haeussler, L. et al., "Simultaneous TA and MS Analysis of Alternating Styrene-Maleimide Copolymers", Thermochim. Acta. 277, p. 14 (1996).

Hardacre, C. et al., "Structure of molten 1,3-dimethylimidazolium chloride using neutron diffraction", J. Chem. Physics, 118(1), pp. 273-278 (2003).

Hay, J.N. et al., A Review of Nanocomposites 2000.

Hoffman, B. et al., "Rheology of Nanocomposites Based on Layered Silicates and Polyamide-12", Colloid Polm. Sci. 278:629-636 (2000).

Ishizu, Koji et al., "Core-Shell Type Polymer Microspheres Prepared from Block Copolymers", Journal of Polymer Science: Part C: Polymer Letters, vol. 26, pp. 281-286 (1988).

Ishizu, Koji, "Synthesis and Structural Ordering of Core-Shell Polymer Microspheres", Prog. Polym. Sci., vol. 23, pp. 1383-1408 (1998).

Ishizu, Koji, "Star Polymers by Immobilizing Functional Block Copolymers", Star and Hyperbranched Polymers, Tokyo Institute of Technology, Meguro-ku, Japan, ISBN 0-8247-1986-7, pp. 135-178 (1999).

Jensen, M. et al., "EXAFS Investigations of the Mechanism of Facilitated Ion Transfer into a Room-Temperature Ionic Liquid", Jacs, 124, pp. 10664-10665 (2002).

Kim, Woo-Sik et al., "Synthesis and Photocrosslinking of Maleimide-Type Polymers", Macromol. Rapid Commun., 17, pp. 835-841 (1996).

Kirk-Othmer, "Vulcanization Agents and Auxiliary Materials", Encyclopedia of Chemical Technology, 3rd Ed., Wiley Interscience, NY, vol. 22, pp. 390-403 (1982).

Krishnamoorti, R. et al., "Rheology of End-Tethered Polymer Layered Silicate Nanocomposites", Macromol., 30, 4097-4102 (1997).

Lagaly, Gehard, "Kink-Block and Gauche-Block Structures of Bimolecular Films", Chem. Int. Ed. Engl. vol. 15, No. 10, pp. 575-586 (1976).

Lawson, David F. et al., "Preparation and Characterization of Heterophase Blends of Polycaprolactam and Hydrogenated Polydienes", Central Research Labs., The Firestone Tire and Rubber Col, Akron, OH 44317, Journal of Applied Polymer Science, vol. 39, John Wiliey & Sons, Inc., pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ma, H. et al., "Reverse Atom Transfer Radical Polymerization of Methyl Methacrylate in Room-Temperature Ionic Liquids", J. Polym. Sci., A. Polym. Chem., 41, pp. 143-151 (2003).

Mandema et al. "Association of Block Copolymers in Selective Solvents, 1 Measurements on Hydrogenated Poly(styrene-isoprene) in Decane and in trans-Decalin", Makromol. Chem. 180, 1521-1538 (1979).

Matsumoto, A. et al., "Synthesis, Thermal Properties, and Gas Permeability of Poly (N-n-alkylmaleimide)", Polymer Journal, vol. 23, No. 3, pp. 201-209 (1991).

Moller, M. et al., Macromol. Symp. 117, pp. 207-218 (1997).

Mossmer, S. et al., Macromol. 33, pp. 4791-4798 (2000).
Newkome G.R , "Dendrimers and Dendrons, Concept, Synthesis, Application", Wiley-VCH, pp. 45, 191-310 (2001).
O'Reilly, Rachel K. et al., "Cross-linked block copolymer micelles: functional nanostructures of great potential and versatility", Chem. Soc. Rev., vol. 35, pp. 1068-1083 (Oct. 2, 2006).
Oranli, Levent et al., "Hydrodynamic studies on micellar solutions of styrene-butadiene block copolymers in selective solvents", Can. J. Chem., vol. 63, pp. 2691-2696 (1985).
Pispas, S. et al., "Effect of Architecture on the Micellization Properties of Block Copolymers: $A_2B$ Miktoarm Stars vs AB Diblocks", Macromolecules, vol. 33, pp. 1741-1746 (Feb. 17, 2000).
Quaternary Ammonium Compounds, Encyclopedia of Chem Tech., 4th Ed. vol. 20, 1996, Wiley & Sons, pp. 739-767.
Quirk, R.P. et al.,Macromolecules, 34, pp. 1192-1197 (2001).
Ren, J., "Linear Viscoelasticity of Disordered Polystyrene-Polyisoprene . . . Layered-Silicate Nanocomposites", Dept. of Chem Eng. Univ. of Houston, Macromol., pp. 3739-3746 (2000).
Riess, Gerard, "Micellization of block copolymers", Prog. Polym. Sci., vol. 28, pp. 1107-1170 (Jan. 16, 2003).
Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).
Thurmond, K. Bruce et al., "Shell cross-linked polymer micelles: stabilized assemblies with great versatility and potential", Colloids and Surfaces B: Biointerfaces, vol. 16, pp. 45-54 (1999).
Tomalia, Donald A. et al., "Dendritic Macromolecules: Synthesis of Starburst Dendrimers", Macromolecules vol. 19, No. 9, contribution from Functional Polymers/Processes and the Analytical Laboratory, Dow Chemical, Midland, MI 48640, pp. 2466-2468 (1986).
Tuzar et al., "Anomalous Behaviour of Solutions of Styrene-Butadiene Block Copolymers in Some Solvents", Makromol. Chem. 178, 22743-2746 (1977).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Tiyapiboonchaiya, C. et al., "Polymer-m-Ionic-Liquid Electrolytes", Micromol. Chem. Phys., 203, pp. 1906-1911 (2002).
Utiyama et al., "Light-Scattering Studies of a Polystyrene-Poly(methyl methacrylate) Two-Blcok Copolymer in Mixed Solvents", Macromolecules vol. 7, No. 4 (Jul.-Aug. 1974).
Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).
Wilson, D.J. et al., "Photochemical Stabilization of Block Copolymer Micelles", Eur. Polym. J., vol. 24, No. 7, pp. 617-621 (1988).
Borukhov, Itamar et al., "Enthalpic Stabilization of Brush-Coated Particles in a Polymer Melt", Macromolecules, vol. 35, pp. 5171-5182 (2002).
Braun, Hartmut et al., "Enthalpic interaction of diblock copolymers with immiscible polymer blend components", Polymer Bulletin, vol. 32, pp. 241-248 (1994).
Brown, H.R. et al., "Communications to the Editor: Enthalpy-Driven Swelling of a Polymer Brush", Macromolecules, vol. 23, pp. 3383-3385 (1990).
Cahn, John W., "Phase Separation by Spinodal Decomposition in Isotropic Systems", The Journal of Chemical Physics, vol. 42, No. 1, pp. 93-99 (Jan. 1, 1965).
Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).
Ferreira, Paula G. et al., "Scaling Law for Entropic Effects at Interfaces between Grafted Layers and Polymer Melts", Macromolecules, vol. 31, pp. 3994-4003 (1998).
Gay, C., "Wetting of a Polymer Brush by a Chemically Identical Polymer Melt", Macromolecules, vol. 30, pp. 5939-5943 (1997).
Halperin, A., "Polymeric Micelles: A Star Model", Macromolecules, vol. 20, pp. 2943-2946 (1987).
Hasegawa, Ryuichi et al., "Optimum Graft Density for Dispersing Particles in Polymer Melts", Macromolecules, vol. 29, pp. 6656-6662 (1996).
Kraus, Gerard, "Mechanical Losses in Carbon-Black-Filled Rubbers", Journal of Applied Polymer Science: Applied Polymer Symposium, vol. 39, pp. 75-92 (1984).
Ligoure, Christian, "Adhesion between a Polymer Brush and an Elastomer: A Self-Consistent Mean Field Model", Macromolecules, vol. 29, pp. 5459-5468 (1996).
Matsen, M.W., "Phase Behavior of Block Copolymer/Homopolymer Blends", Macromolecules, vol. 28, pp. 5765-5773 (1995).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).
Noolandi, Jaan et al., "Theory of Block Copolymer Micelles in Solution", Macromolecules, vol. 16, pp. 1443-1448 (1983).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Shull, Kenneth R., "End-Adsorbed Polymer Brushes in High- and Low-Molecular-Weight Matrices", Macromolecules, vol. 29, pp. 2659-2666 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Witten, T.A. et al., "Stress Relaxation in the Lamellar Copolymer Mesophase", Macromolecules, vol. 23, pp. 824-829 (1990).
Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).
Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).
Antonietti, Markus et al., "Determination of the Micelle Architecture of Polystyrene/Poly(4-vinylpyridine) Block Copolymers in Dilute Solution", Macromolecules, 27, pp. 3276-3281 (1994).
Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).
Batzilla, Thomas et al., "Formation of intra- and intermolecular crosslinks in the radical crosslinking of poly(4-vinylstyrene)", Makromol. Chem., Rapid Commun. 8, pp. 261-268 (1987).
Bauer, B.J. et al., "Synthesis and Dilute-Solution Behavior of Model Star-Branched Polymers", Rubber Chemistry and Technology, vol. 51, pp. 406-436 (1978).
Berger, G. et al., "Mutual Termination of Anionic and Cationic 'Living' Polymers", Polymer Letters, vol. 4, pp. 183-186 (1966).
Bohm, Georg et al., "Emerging materials: technology for new tires and other rubber products", Tire Technology International, 2006 (4 pp.).
Bradley, John S., "The Chemistry of Transition Metal Colloids", Clusters and Colloids: From Theory to Applications, Chapter 6, Weinheim, VCH, pp. 459-544 (1994).
Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).
Calderara, Frederic et al., "Synthesis of chromophore-labelled polystyrene/poly(ethylene oxide) diblock copolymers", Makromol. Chem., 194, pp. 1411-1420 (1993).
Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Cui, Honggang et al., "Block Copolymer Assembly via Kinetic Control", Science, vol. 317, pp. 647-650 (Aug. 3, 2007).

Edmonds, William F. et al., "Disk Micelles from Nonionic Coil—Coil Diblock Copolymers", Macromolecules, vol. 39, pp. 4526-4530 (May 28, 2006).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Hamley, Ian W., "The Physics of Block Copolymers", Oxford Science Publication: Oxford, Chapters 3 and 4, pp. 131-265, (1998).

Ishizu, Koji et al., "Synthesis of Star Polymer with Nucleus of Microgel", Polymer Journal, vol. 12, No. 6, pp. 399-404 (1980).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Kralik, M. et al., "Catalysis by metal nanoparticles supported on functional organic polymers", Journal of Molecular Catalysis A: Chemical, vol. 177, pp. 113-138 (2001).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Nace, Vaughn M., "Nonionic Surfactants: Polyoxyalkylene Block Copolymers", Surfactant Science Series, vol. 60, pp. 1-266 (1996).

O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Piirma, Irja, "Polymeric Surfactants", Surfactant Science Series, vol. 42, pp. 1-289 (1992).

Price, Colin, "Colloidal Properties of Block Copolymers", Applied Science Publishers Ltd., Chapter 2, pp. 39-80 (1982).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Saito, Reiko et al., "Synthesis of Microspheres with Microphase-Separated Shells", Journal of Polymer Science: Part A: Polymer Chemistry, vol. 38, pp. 2091-2097 (2000).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Tsitsilianis, Constantinos et al., Makromol. Chem. 191, pp. 2319-2328 (1990).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392—Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Synthesis, Characterization, and Application of Novel Polymeric Nanoparticles", Macromolecules, 40, pp. 499-508 (2007).

Wang, Xiaorong et al., "Under microscopes the poly(styrene/butadiene) nanoparticles", Journal of Electron Microscopy, vol. 56, No. 6, pp. 209-216 (2007).

Wang, Xiaorong et al., "Heterogeneity of structural relaxation in a particle-suspension system", EPL, 79, 18001, pp. 1-5 (Jul. 2007).

Webber, Stephen E. et al., "Solvents and Self-Organization of Polymers", NATO ASI Series, Series E: Applied Sciences, vol. 327, pp. 1-509 (1996).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules; 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Bridgestone Americas 2006 Presentation (14 pp.).

Sakurai, Ryo et al., "68.2: Color and Flexible Electronic Paper Display using QR-LPD Technology", SID 06 Digest, pp. 1922-1925 (2006).

Gilman, J.W. et al., "Recent Advances in Flame Retardant Polymer Nanocomposites", Proceedings of Fire and Materials 2001, 7th International Conference and Exhibition, Interscience Communications Limited, Jan. 22-24, 2001, San Antonio, TX, pp. 273-283 (2001).

Mendizabal, E. et al., "Functionalized Core-Shell Polymers Prepared by Microemulsion Polymerization", Dept. of Ingenieria Quimica, Univ. de Guadalajara, MX, 477, Antec 97, pp. 1733-1737 (1997).

* cited by examiner

REVERSIBLE POLYMER/METAL NANO-COMPOSITES AND METHOD FOR MANUFACTURING SAME

CROSS-REFERENCE TO RELATED APPLICATION

This application is a divisional of U.S. application Ser. No. 10/872,731, filed on Jun. 21, 2004 now abandoned. This prior application, is hereby incorporated into the present application by reference.

BACKGROUND OF THE INVENTION

The present invention relates to polymer nanoparticles, methods for their preparation, and their use as, for example, templates for the formation of nano-sized metal/inorganic crystals and nanocomposites.

Nanoparticles have attracted increased attention over the past several years in a variety of fields including catalysis, combinatorial chemistry, protein supports, magnets, and photonic crystals. Nano-scale metal composites have also been used advantageously in a variety of fields including, but not limited to, information technology, medicine and health, material and manufacturing, aeronautics and space exploration, environmental, energy fields, and snow/wet traction improvement for tire rubbers. Formation of nano-scale metal composites has often proven difficult due to the expense and difficulty of creating known templates, as well as the often difficult step of separating the composites from the template.

Accordingly, it would be desirable to develop polymer nano-micelle particles with desirable core and surface characteristics and size. It would also be desirable to develop a process for using these nanoparticles as templates to produce nano-scale metal composites and nano-sized metal/inorganic crystals in pure form.

SUMMARY OF THE INVENTION

In one embodiment of the present invention, a method for forming a polymer nano-micelle particle is provided. The method includes forming a copolymer comprising alkenyl monomer units and maleimide monomer units in a dry state, placing the copolymer into a non-polar solvent, and allowing the copolymer chains to form micelles.

In another embodiment, a method for forming metal nano-composites is provided. The method includes forming a copolymer comprising alkenyl monomer units and alkyl maleimide monomer units in a dry state, placing the copolymer into a non-polar solvent and allowing the copolymer chains to form micelles. At least one metal in solution is added to the solvent containing micelles, thereby allowing the metal to complex with the copolymer chains in the desired concentrations, forming the metal nanocomposites.

A third embodiment, the present invention provides a method comprised of dissolving the polymer particles in a suitable solvent, thereby obtaining nano-sized metal/inorganic crystals in pure form, and regenerating the polymer.

The following definitions apply herein throughout unless a contrary intention is expressly indicated:
"vinyl aromatic hydrocarbon" and "alkenyl benzene" are used interchangeably;
"maleic anhydride" encompasses dicarboxylic acids, including maleic anhydride that can form a copolymer with an alkenyl benzene, an $R^1R^2$-ethylene, or an alkyl vinyl ether, the copolymer having dicarboxylic acid units capable of reaction with an amine functional group;
"maleimide" encompasses the reaction product of an amine and the dicarboxylic acids described above;
"$R^1R^2$-ethylene" encompasses compounds of the general formula:

where $R^1$ and $R^2$ are the same or different substituents on the same or different carbon atoms of the ethylene group, and are independently H or substituted $C_1$-$C_{20}$ alkyl groups; and
poly(alkenyl-co-maleimide) includes, for example, poly (alkenylbenzene-co-maleimide), poly($R^1R^2$-ethylene-co-maleimide), and poly(alkyl vinyl ether-co-maleimide).

DETAILED DESCRIPTION OF ILLUSTRATIVE EMBODIMENTS GENERAL NANOPARTICLE PROCESS OF FORMATION

One exemplary polymer nanoparticle of the present invention is formed from polymer chains. Preferred polymers include alkylmaleimides. The copolymers are preferably poly (alkenyl-co-maleimide)s and may optionally be crosslinked to form the desired polymer nanoparticles. The polymer nanoparticles have diameters—expressed as a mean average diameter—that are preferably less than about 100 nm, more preferably less than about 75 nm, and most preferably less than about 50 nm. The polymer nanoparticles preferably are substantially monodisperse and uniform in shape. The dispersity is represented by the ratio of $M_w$ to $M_n$, with a ratio of 1 being substantially monodisperse. The polymer nanoparticles of the present invention preferably have a dispersity less than about 2.5, more preferably less than about 2.2, and most preferably less than about 1.8. Moreover, the polymer nanoparticles are preferably spherical, though shape defects are acceptable. The formation of polymer nanoparticles is preferably reversible. The reversible process can be achieved by, for example, changing solvent, varying temperature, or altering pH value etc.

The poly(alkenyl-co-maleimide)s contain alkenyl contributed monomer units chosen from vinyl-substituted aromatic hydrocarbon, $R^1R^2$-ethylene, and/or alkyl vinyl ether. The copolymer further includes maleimide contributed monomer units.

Poly(alkenyl-co-maleimide)s and poly(alkenyl-co-maleic anhydride)s encompass random and stereospecific copolymers, including copolymers having a backbone with alternating alkenyl-contributed units (i.e., monomer units derived from an alkenyl group such as styrene) and maleimide- or maleic anhydride-contributed units (i.e., monomer units derived from a maleimide or a maleic anhydride). Such alternating structures typically are described as poly(alkenyl-alt-maleimide)s and poly(alkenyl-alt-maleic anhydride)s; however, these polymers are encompassed within the terms poly(alkenyl-co-maleimide)s and poly(alkenyl-co-maleic anhydride)s. Exemplary copolymers include copolymers with a ratio of about 50% alkenyl contributed monomer units and about 50% maleimide contributed monomer units. However, copolymers with at least about 20% alkenyl contributed monomer units are also contemplated for use.

Preferred vinyl-substituted aromatic hydrocarbon contributed monomer units of a poly(alkenylbenzene-co-maleimide) are preferably derived from one or more of styrene, α-methylstyrene, 1-vinyl-naphthalene, 2-vinyl-naphthalene, 1-α-methyl vinyl naphthalene, 2-α-methyl naphthalene, as well as alkyl, cycloalkyl, aryl, alkaryl, and aralkyl derivatives thereof, in which the total number of carbon atoms in the combined hydrocarbon is generally not greater than 18, as well as any di- or tri-vinyl aromatic hydrocarbons. Preferred vinyl aromatic hydrocarbons include styrene and/or α-methyl styrene.

Preferred $R^1$ and $R^2$ groups of $R^1R^2$-ethylene contributed monomer units and the alkyl groups of said alkyl vinyl ether contributed monomer units are independently selected from methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropoyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxyoctyl, octyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-bethylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, or 2,5-dimethylhexyl.

Preferred $R^1R^2$-ethylene contributed monomer units of the poly($R^1R^2$-ethylene-co-maleimide) include alkenes such as ethylene, propylene, butylene, isobutylene, pentene, hexene, heptene, etc., as well as any di- or tri-alkene, or mixtures thereof, with preference given to isobutylene.

Preferred alkyl vinyl ether contributed monomer units of the poly(alkyl vinyl ether-co-maleimide) include any alkyl vinyl ether such as methyl vinyl ether, ethyl vinyl ether, propyl vinyl ether, butyl vinyl ether, and any other alkyl vinyl ether wherein the number of carbons in the alkyl substituent is not greater than about 30, and mixtures thereof. A preferred alkyl vinyl ether is methyl vinyl ether.

The poly(alkenyl-co-maleimide) can be formed by reacting a poly(alkenyl-co-maleic anhydride) in the presence of ammonia or amines at temperatures from about 100° C. to about 300° C. and at a pressure from about slightly above vacuum to about 2000 kPa, under substantially dry conditions. Alternatively, the poly(alkenyl-co-maleic anhydride) may be mixed with a primary amine. The poly(alkenyl-co-maleic anhydride) may be prepared by any means known in the art for forming copolymers. Free radical polymerization is preferred, but other means are contemplated. The individual monomer units may be distributed in any of a random or alternating arrangement along the polymer backbone. Furthermore, the backbone may be linear or branched. The poly(alkeneyl-co-maleic anhydride) and ammonia or amines are preferably dry mixed in the absence of solvents in a suitable mixing apparatus such as a Brabender mixer. Purging the mixer with $N_2$ prior to charging of the reactants can be beneficial. The amines or ammonia may be added in a single charge, or in sequential partial charges into the reactor containing a charge of poly(alkenyl-co-maleic anhydride). Preferably, the amine or ammonia is charged in a ratio of between about 0.8 to 1.0 moles of nitrogen (in the primary amine or ammonia) per monomer contributed units of maleic anhydride in the poly(alkenyl-co-maleic anhydride).

Suitable primary amines include but are not limited to alkyl amines; alkyl benzyl amines; alkyl phenyl amines; alkoxybenzyl amines; allyl aminobenzoates; alkoxy aniline; and other linear primary amines containing from 1 to about 50 carbon atoms, preferably about 6 to about 30 carbon atoms in the alkyl and alkoxy substituents in these primary amines. The alkyl and alkoxy substituents of the primary amines can be linear or branched, preferably linear, and saturated or unsaturated, preferably saturated. Exemplary amines include hexylamine, octylamine, and dodecylamine. Ammonia is the most preferred nitrogen source due to the improved solubility of the resulting product in the electrolyte solutions. The poly(alkenyl-co-maleimide) preferably has a weight-average molecular weight ($M_w$) between about 10,000 and 500,000, more typically between about 150,000 and 450,000.

After formation of the copolymers, they are dispersed in a non-polar solvent, such as a hydrocarbon solvent, leading to the formation of a micellar solution. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination.

With respect to the monomers and solvents identified herein, nano-sized micelle particles are formed by maintaining a temperature that is favorable to micelle formation in the selected solvent(s). More particularly, by maintaining suitable conditions, the nanoparticles will begin to form in the shape of micelles wherein the polar constituents of the copolymer chains, e.g., maleimide, preferentially form the center of the micelle and the non-polar constituents of the copolymer chains, e.g., the alkyl side chains radiate, outwardly therefrom. Exemplary temperatures for the polymers discussed herein are in the range of about −40 to 250° C., with a temperature in the range of about 0 to 150° C. being particularly preferred. As demonstrated in more detail below, the interaction of copolymer selection, temperature, and solvent facilitates the formation of the micelles and ultimately the desired nanoparticles.

Metal Nanocomposite Formation

Nano-sized micelle particles produced in accordance with the present invention may be advantageously utilized as templates in the formation of nano-sized metal nanocomposites and metal/inorganic crystals. The formation of metal nanocomposites is preferably carried out by exposing the nanoparticles to metal ions, preferably metal ions in solution. The metal ion is then complexed with imine groups located inside the nanoparticle. Nano-sized metal/inorganic crystals are formed by introducing a suitable agent, e.g. $H_2S$, $CO_3^{2-}$ and etc., which may react with the metal ions to form crystals within the micelle particles. Advantageously, the condensed nature of the nanoparticles may restrict the growth of the metal nanocomposites, thus providing size control of the metal nanocomposites into nano-scales.

Metals contemplated for use in the present invention include those known in the art as useful in semiconductors, catalysts, magnetic and quantum dots etc., including but not limited to Cu, Ti, Fe, Cd, Ni, Pd, and mixtures thereof. The formation of the metal nanocomposites is preferably carried out at a temperature of between about 0 and 100° C., more preferably between about 0 and 50° C. Preferred solvents useful in the formation include toluene, tetrahydrofuran ("THF"), water, alcohol, and mixtures thereof.

Separation of the metal nano-composites from the nanocomposites is achieved by performing a solvent change. For example, a solvent in which the polymer chains within the nanoparticles are soluble may be utilized. Such a solvent would induce swelling, and possibly dissolving, of the nanoparticles, thus allowing separation of the nano-sized metal/inorganic crystals from the nanoparticles. Preferred solvents for the separation step include THF, $HCCl_3$, $CCl_4$, toluene, and mixtures thereof.

Nano-sized metal/inorganic crystals produced in accordance with the present invention preferably have a mean average diameter less than about 50 nm, more preferably less than about 20 nm, and most preferably less than about 10 nm.

Of course, the present inventive nano-sized metal/inorganic crystals are suited to applications including the medical field, e.g. drug delivery and blood applications, information technology, e.g. quantum computers and dots, aeronautical and space research, energy, e.g., oil refining and lubricants, and tire applications such as snow/wet traction improvements.

The following examples are provided to help illustrate the present invention. The examples are not provided to limit the scope of the invention defined by the appended claims.

EXAMPLES

Example 1

Preparation of Alkylmaleimide Copolymers

A $N_2$ purged Brabender mixer (~310 g capacity) equipped with Banbury blades was set to 10 rpm and 30° C. The mixer was then charged with 120 g of poly(maleimide-alt-isobutylene) (Kuraray, commercial name IM-10, $M_n$=350 K) and 99.4 g of octyl amine (Aldrich, 99% purity). The mixture was agitated in the mixer for 10 minutes and then heated up at a rate about 10° C./min to 210° C. Once the temperature reached 125° C., agitation was stopped. After reaching a temperature of 210° C., the heating element was set to the isothermal condition. The agitation was then started and increased from 0 to 90 rpm at a rate of 10 rpm/min. Once the agitation speed reached 90 rpm, the temperature was set to 190° C. The mixing was continued isothermally for an additional 90 minutes, the heating element was then turned off and the polymer was allowed to cool down at a rate ~4° C./min. The final product was removed from the mixer at 160° C.

Example 2

The experiment and the procedure of example 1 were repeated, except for a minor change of the chemicals used. The mixer was charged with 100 g of poly(maleimide-alt-isobutylene) (Kuraray, commercial name IM-10, $M_n$=350 K) and 118.8 g of dodecyl amine (Aldrich, 95% purity).

Example 3

A nitrogen purged Brabender mixer (~310 g capacity) equipped with Banbury blades was set to 20 rpm and 60° C. The mixer was charged with 85 g of poly(maleimide-alt-isobutylene) (Kuraray, commercial name IM-10, $M_n$=350 K) and 146.8 g of octadecyl amine (Aldrich, 99% purity). The mixture was agitated in the mixer for 10 minutes and then heated up at a rate about 10° C./min to 200° C. Once the temperature reached 135° C., agitation was stopped. When the temperature reached 200° C., the heating element was set to the isothermal condition. The agitation was then started and increased from 0 to 120 rpm at a rate of 10 rpm/min. The mixing was continued isothermally for additional 160 minutes, the heating element was then turned off and the polymer was allowed to cool down at a rate ~4° C./min. The final product was removed from the mixer at 160° C.

IR characteristic absorption peaks are 1701, 1770, 2855, 2926 $cm^{-1}$. No trace of maleic anhydride absorption peaks (i.e., at 1779 and 1855 $cm^{-1}$) and amino-group peaks (i.e., at 3330) were detected for these copolymers. The molecular weights of these products were measured by GPC in THF solution, using polystyrene as the standard. The results are listed below:

|  | Ex. 1 | Ex. 2 | Ex. 3 |
| --- | --- | --- | --- |
| Molecular weight, $M_n$ | 116k | 98k | 121 |
| Polydispersity $M_w/M_n$ | 1.76 | 2.16 | 2.07 |
| Intrinsic Viscosity in THF, 20° C. | 0.75 | 0.72 | 0.75 |

Use of Alkylmaleimide Copolymers for Nano-Tech

Example 4

Two 40 mL bottles were charged with materials as described below. The bottles were named as bottles A and B, respectively. The material inside those bottles was named accordingly as material A and B.

A) 0.2009 g of the products from example 3 were added into 10.056 g dodecane solvent. After being stirred overnight, the alkylmaleimide copolymer was dissolved. The solution was highly translucent and colorless. The solution was then further diluted with addition additional 10.2 g of dodecane. The concentration of the solution was about 1%.

B) 0.5 g of $CuAc_2$ was added into a 15 g of THF. After vigorous stirring for half hour, the $CuAc_2$ was dissolved. The solution was highly translucent to light and was dark blue in color.

The material in bottle A was then charged with 1.0 mL of solution from bottle B. The resulting solution was light blue. Half of the solution was placed in a vacuum oven at 100° C. Further drying of the product under vacuum yielded a polymer-Cu complex film. The film was dark blue, but transparent to light, indicating that the size of $Cu^{++}$ clusters in the film was in the nano-meter range.

Example 5

$H_2S$ gas was bubbled through the remaining solution in bottle A to fully convert the $Cu^{++}$ ions to CuS. The solution was then purged with $N_2$ to remove the excess of $H_2S$. The resulting solution is dark colored, with no macroscopic precipitation of CuS from solution. This indicated that the CuS formed are nano-sized and remain within the nanoparticle. (If taking a pure dodecane solvent and then charging with the same amount of $Cu^{++}$/THF solution, one would find that there was a macroscopic precipitation of CuS from the solution once bubbling $H_2S$ through the solution.) Finally, the CuS/polymer solution was placed in a vacuum oven at 100° C. Further drying of the product under vacuum yielded a polymer/nano-sized CuS composite. The material was black, but highly translucent to light.

Example 6

Figure 1:
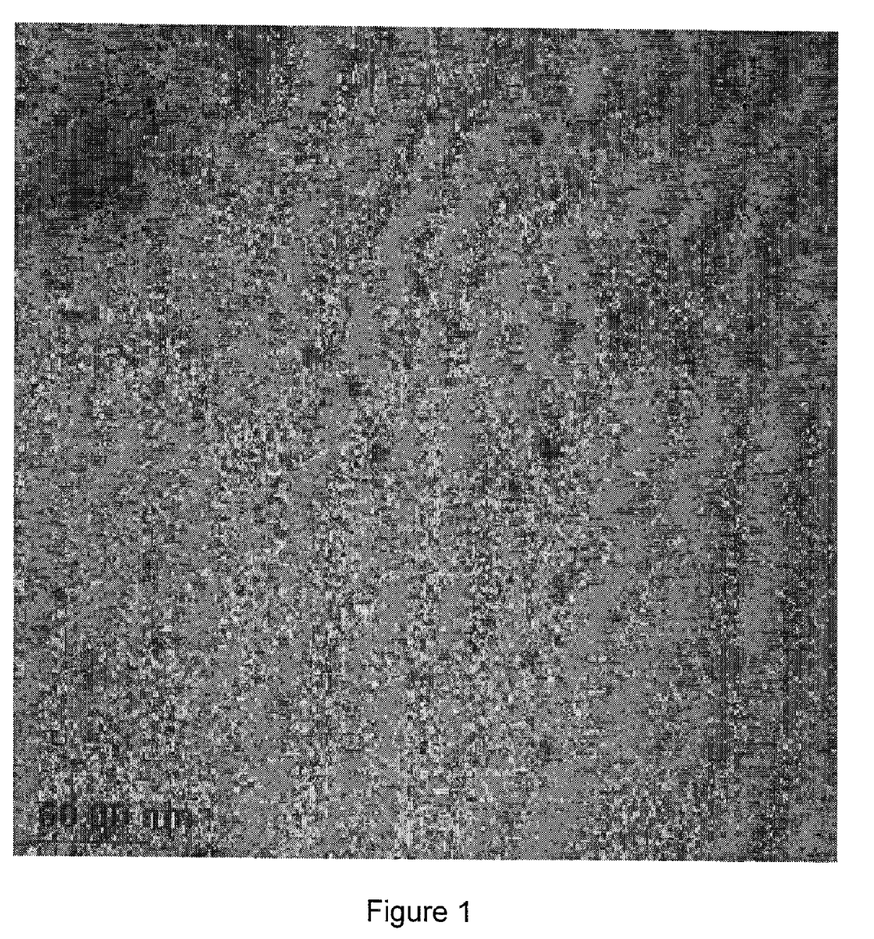
FIG. 1 is a transmission electron microscopy (TEM) photograph of metal nanocomposites formed in accordance with EXAMPLE 6.

About 1 mL of the CuS/polymer solution, prepared according to example 5, was further diluted to 50 times with hexane solvent. A drop of the diluted solution was then coated on a graphed copper micro-grid. After the solvent was evaporated, the screen was examined by TEM (FIG. 1). The result demonstrates that the sizes of the particles are of nano-scales (the scale is 60 nm). The size of the CuS particles was about 5 to 10 nm in diameter.

Example 7

Figure 2:
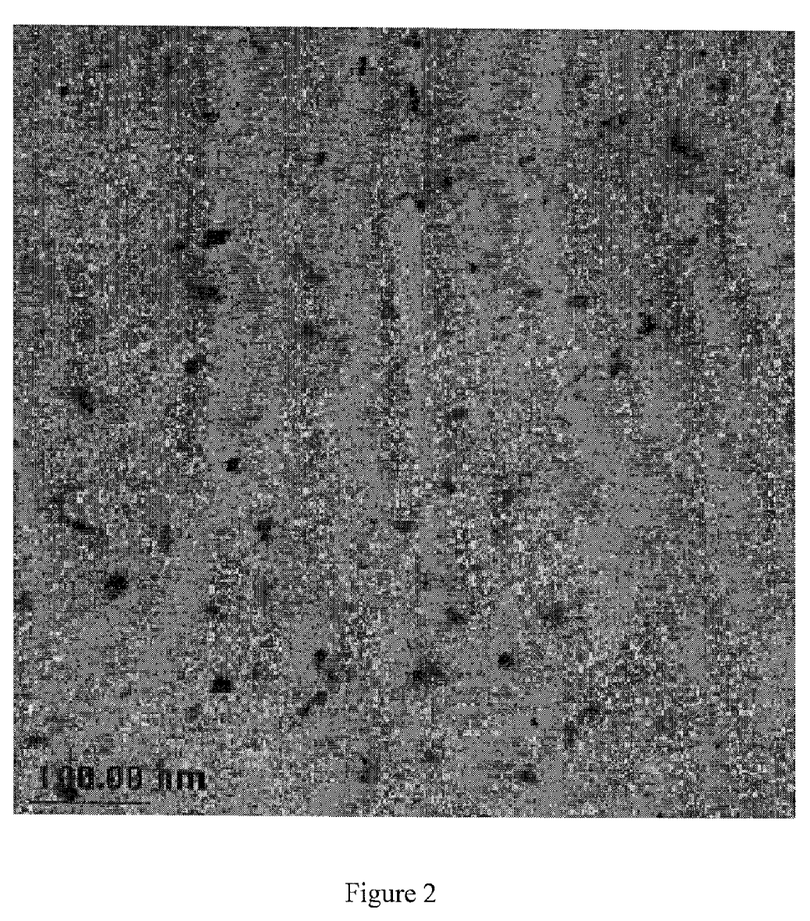
FIG. 2 is a TEM photograph of metal nanocomposites formed in accordance with EXAMPLE 7.

About 1 mL of the CuS/polymer solution, prepared according to example 5, was further diluted to 50 times with THF solvent. THF is known as a good solvent for alkylmaleimide copolymers. Once THF was added, the CuS nano-crystals aggregated and precipitated. After filtrated, a small amount of the CuS was re-dispersed into THF by ultrasound. A drop of the diluted solution was then coated on a graphed copper micro-grid. After the solvent was evaporated, the screen was examined by TEM (FIG. 2). The result demonstrates that using THF solvent in fact dissolves the polymer molecules surround the particle, and the resulting particles aggregate to sub-micrometers (the scale is 100 nm). This phenomenon is very important since it allows separation of the nano-sized metal/inorganic crystals from the alkylmaleimide copolymer nano-micelles and the solvent by using simple centrifuge or filtration. The polymer and the solvent can then be recycled or reused again. After separation the aggregated nano-sized metal/inorganic crystals can be re-dispersed into dodecane solvent via addition of the copolymer.

The invention has been described with reference to the exemplary embodiments. Modifications and alterations will occur to others upon reading and understanding the specification. The invention is intended to include such modifications and alterations insofar as they come within the scope of the disclosure and claims.

It is claimed:

1. A polymer metal composite nanoparticle comprising:
   a polymer including alkenyl monomer contributed units and maleimide monomer contributed units; and
   a metal molecule complexed to one or more of said maleimide monomer contributed units;
   wherein the maleimide monomer contributed units form a center of a micelle and the alkenyl monomer contributed units form side chains radiating outwardly from the center, wherein the metal molecule is inside the center of the micelle.

2. The polymer metal composite nanoparticle of claim 1, wherein the polymer metal composite nanoparticle has a mean average diameter of less than about 100 nm.

3. The polymer metal composite nanoparticle of claim 1 wherein the alkenyl monomer contributed units are side chains to a backbone of the polymer.

4. The polymer metal composite nanoparticle of claim 1 wherein said metal is selected from Cu, Ti, Fe, Cd and mixtures thereof.

5. The polymer metal composite nanoparticle of claim 1 wherein the metal molecule is part of a metal/inorganic crystal having a mean average diameter of about 50 nm to about 10 nm.

6. The polymer metal composition nanoparticle of claim 1, wherein the alkenyl monomer units are selected from the group consisting of vinyl-substituted aromatic hydrocarbons, R1R2 ethylenes, alkyl vinyl ethers, and mixtures thereof.

* * * * *